United States Patent [19]

Furumura et al.

[11] Patent Number: 4,642,544
[45] Date of Patent: Feb. 10, 1987

[54] CONTROL CIRCUIT FOR DRIVING STEP MOTOR

[75] Inventors: Takashi Furumura; Takeo Ohba, both of Tokyo, Japan

[73] Assignee: Mitsubishi Denki Kabushiki Kaisha, Tokyo, Japan

[21] Appl. No.: 763,244

[22] Filed: Aug. 7, 1985

[30] Foreign Application Priority Data

Aug. 11, 1984 [JP] Japan ................................ 59-168157

[51] Int. Cl.$^4$ .............................................. H02P 8/00
[52] U.S. Cl. ...................................... 318/696; 318/685
[58] Field of Search ......................... 318/696, 685, 603

[56] References Cited

U.S. PATENT DOCUMENTS

4,476,421 10/1984 Moriguchi ........................... 318/696
4,528,491 7/1985 Takeuchi et al. ................... 318/603

Primary Examiner—Bernard Roskoski
Assistant Examiner—Saul M. Bergmann
Attorney, Agent, or Firm—Cushman, Darby & Cushman

[57] ABSTRACT

A control circuit for driving a step motor with at least first and second phase coils each having corresponding phase control elements. A memory stores phase switching data and is connected to the phase control elements. A first counter supplies phase switching data addresses to the memory to identify the coil or coils and phase thereof to be driven in response to step driving pulses and a second counter supplies data addresses to control the ON/OFF of the phase switching data and hence the phase current value. An oscillator drives the second counter at a frequency greater than the frequency of the step driving pulses.

2 Claims, 8 Drawing Figures

CONTROL CIRCUIT FOR DRIVING STEP MOTOR

BACKGROUND OF THE INVENTION

1. Field of the Invention

This invention relates to a control circuit for driving a step motor.

2. Description of the Prior Art

Step motors (also called stepping or pulse motors) in general have a rotor which rotates in a predetermined step-degree arc for one step pulse and are widely used in moving portions of automatic machines such as x-y plotters, x-y recorders and industrial robots, because the angle of rotation of the rotor is controllable according to the number of input step pulses.

There is a known control circuit for driving such a step motor to rotate in such a manner as to make memory elements such as programmable ROMs (Read Only Memories) store phase switching data beforehand, count step pulses using address counters to access the data stored in the memory elements according to the outputs of the counters, and control the "on" and "off" states of the current flowing through the motor's different phase coils based on the phase switching data read out.

The phase switching data stored in the memory elements is step switching data for rotating the rotor of the motor step angle by step angle as predetermined according to the step pulse and the data has such contents as shown in Table 1.

TABLE 1

| Step: | Address: $A_2$ | $A_1$ | $A_0$ | Phase Switching Data: Phase B | Phase A | Phase $\bar{B}$ | Phase $\bar{A}$ |
|---|---|---|---|---|---|---|---|
| 0 | 0 | 0 | 0 | 0 | 0 | 0 | 1 |
| 1 | 0 | 0 | 1 | 0 | 0 | 1 | 1 |
| 2 | 0 | 1 | 0 | 0 | 0 | 1 | 0 |
| 3 | 0 | 1 | 1 | 0 | 1 | 1 | 0 |
| 4 | 1 | 0 | 0 | 0 | 1 | 0 | 0 |
| 5 | 1 | 0 | 1 | 1 | 1 | 0 | 0 |
| 6 | 1 | 1 | 0 | 1 | 0 | 0 | 0 |
| 7 | 1 | 1 | 1 | 1 | 0 | 0 | 1 |

Table 1 above shows an example of the phase switching data wherein a four-phase step motor with phases A,B,$\bar{A}$,$\bar{B}$ is one-two phase excited by a unipolar driving circuit to set 8 steps as a repeat period, whereby (1) and (0) correspond to ON and OFF, respectively. Since the motor can thus be driven without changing the circuit through other exciting methods by rewriting the data of Table 1, such phase signal control circuits for producing phase switching signals using memory elements are widely in use.

In the steps 0,2,4,6 of Table 1, an excitation current is allowed to flow through the coil of only one of the phases A,B,$\bar{A}$,$\bar{B}$ (one phase excitation) on the one hand, and the excitation current is caused to flow through the coil of phases A,B simultaneously (two phase excitation) in the other steps, for instance, in step 1. Accordingly, the generated motor torque in one phase excitation and the unbalance between them becomes the source of vibration, noise, or an error in angle when a load is applied. Moreover, the maximum number of steps obtainable using the four phase coil in the unipolar driving method is 8, which is the case with one-two phase excitation drive. Although one step in that case is equivalent to $\frac{1}{2}$ of a conventional step (the so-called one full step) in view of the standard terminology of the step motor, it may have to be driven in small steps with high resolution. When the motor speed and motor load differ, it is also desirous that the torque should be selected according to the speed and load.

Heretofore, attempts have been made to stablize the balance of torque, turn the motor by steps smaller than the full step of $\frac{1}{2}$ and control the torque in proportion to the motor speed and motor load by adding an analog circuit such as a current control circuit to the digital circuit. However, the disadvantage is that the addition of such an analog circuit not only makes the circuit arrangement more complex and expensive but also creates some difficulty in design alteration.

SUMMARY OF THE INVENTION

In view of the foregoing, an object of the present invention is to provide a control circuit for driving a step motor, the circuit being capable of driving the step motor with less noise and vibration, a highly accurate minute step angle and a simple circuit confirguration without using an analog current control circuit, and of controlling motor torque proportionately to motor speed and load.

In a control circuit for driving a step motor according to the present invention switching elements control ON/OFF of each phase current of the step motor and memory elements store data for controlling each phase switching element. Each phase current value is controlled by accessing the memory elements according to the output from a first address counter for counting step pulses and that from a second address counter for counting clock pulses higher in speed than the step pulses. Phase switching data produced from the memory elements is determined according to the output from the first address counter and the ON/OFF status of the phase switching data is determined according to the output from the second address counter. Accordingly, each phase current value is made controllable by controlling the ON/OFF ratio of each phase switching element in the so called pulse duty with a simple circuit configuration, whereby it is possible to provide minute step driving, operation with less noise and vibration, control of torque proportionately to the load and high-speed driving.

DETAILED DESCRIPTION OF THE DRAWINGS

Figure 1:
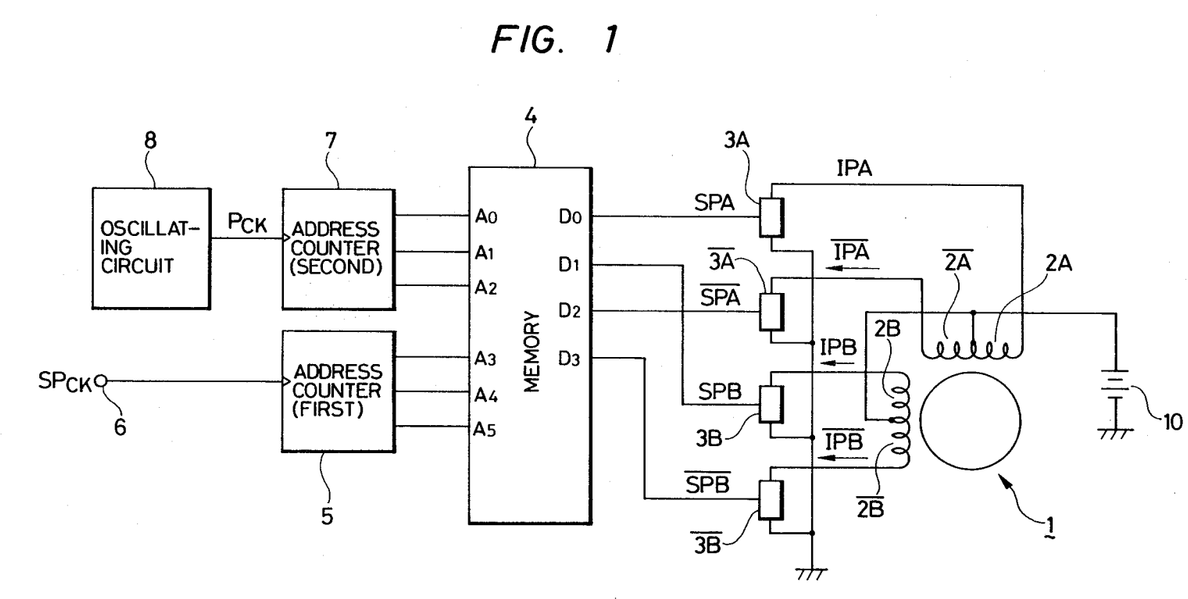
FIG. 1 is a block circuit diagram illustrating an embodiment of the present invention.

Referring now to the drawings, there will be described in detail a circuit for driving a four-phase step motor using a unipolar pulse through the one-two excitation method. Referring to FIG. 1, motor 1 is equipped with coils 2A,$\overline{2A}$, 2B $\overline{2B}$ in phases A, $\bar{A}$, B, $\bar{B}$ respectively. These coils are provided with switching elements 3A,$\overline{3A}$,3B,$\overline{3B}$ such as transistors or FETs for controlling ON/OFF the phase currents IPA, $\overline{IPA}$, IPB, $\overline{IPB}$, respectively. Each of the switching control signals SPA, $\overline{SPA}$, SPB, $\overline{SPB}$ read out of the memory elements 4 are supplied, as occasion demands, to the control terminal (base terminal or gate terminal) of each of the switching elements 3A, $\overline{3A}$, 3B, $\overline{3B}$ through a buffer amplifier (not shown).

As a memory element 4, a programmable ROM (Read Only Memory) such as EPROM 2764 from Intel and the like with at least six address bits and four data bits, for instance, is used and the internal data is represented by what is shown in Table 2.

lower three bit addresses $A_0$–$A_2$ are provided as current control addresses.

The first address counter 5 of FIG. 1 is a three bit binary counter, which operates to specify the phase switching addresses $A_3$–$A_5$ of the memory elements according to the three bit output obtained by counting the step pulse SPCK from the input terminal 6. In addition, the second address counter 7 is also a three bit binary counter, which counts a high speed clock pulse PCK and specifies the addresses $A_0$–$A_2$ for controlling the current of the memory 4 according to the three bit output. Address counters Serial No. 74LS393 from Texas Instruments or MC14510B or MC14024B from Motorola are suitable or oscillator MCI14069B from Motorola also can be used.

TABLE 2

| STEP | PHASE SWITCHING ADDRESS | | | CURRENT CONTROL ADDRESS | | | EACH PHASE CONTROL DATA PHASE | | | |
|---|---|---|---|---|---|---|---|---|---|---|
| | $A_5$ | $A_4$ | $A_3$ | $A_2$ | $A_1$ | $A_0$ | A $D_0$ | B $D_1$ | $\overline{A}$ $D_2$ | $\overline{B}$ $D_3$ |
| 0 | 0 | 0 | 0 | 0 | 0 | 0 | 1 | 0 | 0 | 0 |
| | | | | 0 | 0 | 1 | | | | |
| | | | | 0 | 1 | 0 | | | | |
| | | | | 0 | 1 | 1 | 0 | 0 | 0 | 0 |
| | | | | 1 | 1 | 1 | | | | |
| 1 | 0 | 0 | 1 | 0 | 0 | 0 | 1 | 1 | 0 | 0 |
| | | | | 0 | 0 | 1 | | | | |
| | | | | 0 | 1 | 0 | 0 | 0 | 0 | 0 |
| | | | | 1 | 1 | 1 | | | | |
| 2 | 0 | 1 | 0 | 0 | 0 | 0 | 0 | 1 | 0 | 0 |
| | | | | 0 | 0 | 1 | | | | |
| | | | | 0 | 1 | 0 | | | | |
| | | | | 0 | 1 | 1 | 0 | 0 | 0 | 0 |
| | | | | 1 | 1 | 1 | | | | |
| 3 | 0 | 1 | 1 | 0 | 0 | 0 | 0 | 1 | 1 | 0 |
| | | | | 0 | 0 | 1 | | | | |
| | | | | 0 | 1 | 0 | 0 | 0 | 0 | 0 |
| | | | | 1 | 1 | 1 | | | | |
| 4 | 1 | 0 | 0 | 0 | 0 | 0 | 0 | 0 | 1 | 0 |
| | | | | 0 | 0 | 1 | | | | |
| | | | | 0 | 1 | 0 | | | | |
| | | | | 0 | 1 | 1 | 0 | 0 | 0 | 0 |
| | | | | 1 | 1 | 1 | | | | |
| 5 | 1 | 0 | 1 | 0 | 0 | 0 | 0 | 0 | 1 | 1 |
| | | | | 0 | 0 | 1 | | | | |
| | | | | 0 | 1 | 0 | 0 | 0 | 0 | 0 |
| | | | | 1 | 1 | 1 | | | | |
| 6 | 1 | 1 | 0 | 0 | 0 | 0 | 0 | 0 | 0 | 1 |
| | | | | 0 | 0 | 1 | | | | |
| | | | | 0 | 1 | 0 | | | | |
| | | | | 0 | 1 | 1 | 0 | 0 | 0 | 0 |
| | | | | 1 | 1 | 1 | | | | |
| 7 | 1 | 1 | 1 | 0 | 0 | 0 | 1 | 0 | 0 | 1 |
| | | | | 0 | 0 | 1 | | | | |
| | | | | 0 | 1 | 0 | 0 | 0 | 0 | 0 |
| | | | | 1 | 1 | 1 | | | | |

In Table 2, each control data $D_0$–$D_3$ of four bits is designed to ON/OFF control each phase switching elements, data $D_0$ corresponding to the switching element 3A, data $D_1$ to the switching element 3B, data $D_2$ to the switching element $\overline{3A}$, and data $D_3$ to the switching element $\overline{3B}$. Moreover, a (1) of each phase control data means the corresponding element is turned on, whereas it is turned off at (0). Subsequently, of the six bit addresses, $A_3$–$A_5$, the three upper bit addresses are provided as phase switching addresses, whereas the To each phase coil 2A–$\overline{2B}$ of the step motor 1 is supplied the driving current from a d.c. current supply source 10 for a motor and, when each phase switching element 3A–$\overline{3B}$ is turned on, the current is caused to flow through the corresponding coil.

As set forth above, each rotating step of the step motor is determined by the current pattern of each coil corresponding to the phase switching data of Table 1, whereas in Table 2 the phase switching data specified by the upper three bit phase switching data is determined ON/OFF according to the lower three bit current control addresses $A_0 A_2$. In other words, the total number of steps specified by the three bit phase switching address $A_3 A_5$ is $2^3=8$ and, because eight word data is specified by the three bit current control addresses $A_0 A_2$ for eight steps, the phase switching data is assigned to some words of the eight words and OFF data whose total bit is (0) should be written to the remaining words. For instance, in the step 0 when the phase switching address is (000), there is specified phase switching data as to exciting and driving only the phase A coil 2A by turning on only the phase A switching element 3A. However, the phase switching data above, that is, four bit data whose $D_0$ only is (1) and the other $D_1 D_3$ are (0) is assigned to three words with the current control address ranging from (000) to (010) in the step 0, whereas the OFF data whose total bit is (0) is written to five words with the current control address ranging from (011) to (111), respectively.

Subsequently, the operation of the control circuit thus constructed for driving the step motor will be described.

Figure 2:
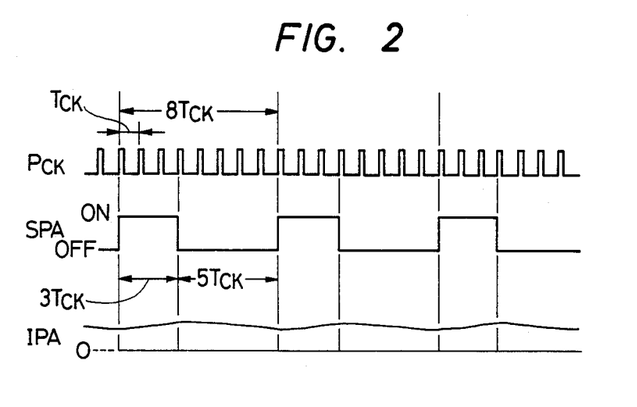
FIG. 2 is a wave form chart illustrating phase current control operation.

The step pulse SPCK is intended to step by step drive the step motor 1 and the speed of revolution of the motor 1 is determined according to the frequency $f_{sp}$ of the pulse SPCK. Accordingly, when the speed of revolution of the motor is set variable, the frequency $f_{sp}$ is also changeable and the upper limit of the frequency $f_{sp}$ is roughly set at 2 kHz–10 kHz. To the contrary, the frequency $f_{ck}$ of the high speed clock pulse PCK from the oscillating circuit 8 is set sufficently higher than the freqency $f_{sp}$, for instance, at 100 kHz–200 kHx or more. The current control address is cyclically scanned depending on the clock pulse PCK and the data of the eight words is repeatedly provided for access in a period of eight clocks. Consequently, in the step 0 whose phase switching address is (000), for instance, the switching control signal SPA of Fig.2 is produced from the data terminal $D_0$ of the memory element 4. In FIG. 2, the period of the high speed clock pulse PCK is assumed TCK ($=1/f_{ck}$) and, when the square pulse signal SPA with 8TCK taken by the switching control signal SPA as a period and its duty (ON/OFF ratio) being $\frac{3}{8}$ is supplied to the switching element 3A, current IPA of FIG. 2, for instance, flows through the phase A coil 2A of the motor 1. Although the phase A current IPA of FIG. 2 contains a slight ripple, the current can be changed into a roughly constant value by sufficently setting 8TCK as the period of the switching control pulse smaller than the time constant determined by the inductance and resistance of each phase coil of the motor and the phase current at this time is determined according to the duty of the switching control pulse signal.

Accordingly, of eight words corresponding to the current control address in any one step, the phase current value corresponding to the number of words written to the phase switching data is determined and the phase current value may be controlled in eight stages by changing the number of words written to the phase switching data from 1 to 8. As the second address counter of FIG. 1, there is generally used an N-progressing counter so as to make possible control of the phase current condition in N stages by setting the number of words per step at N.

Figure 3:
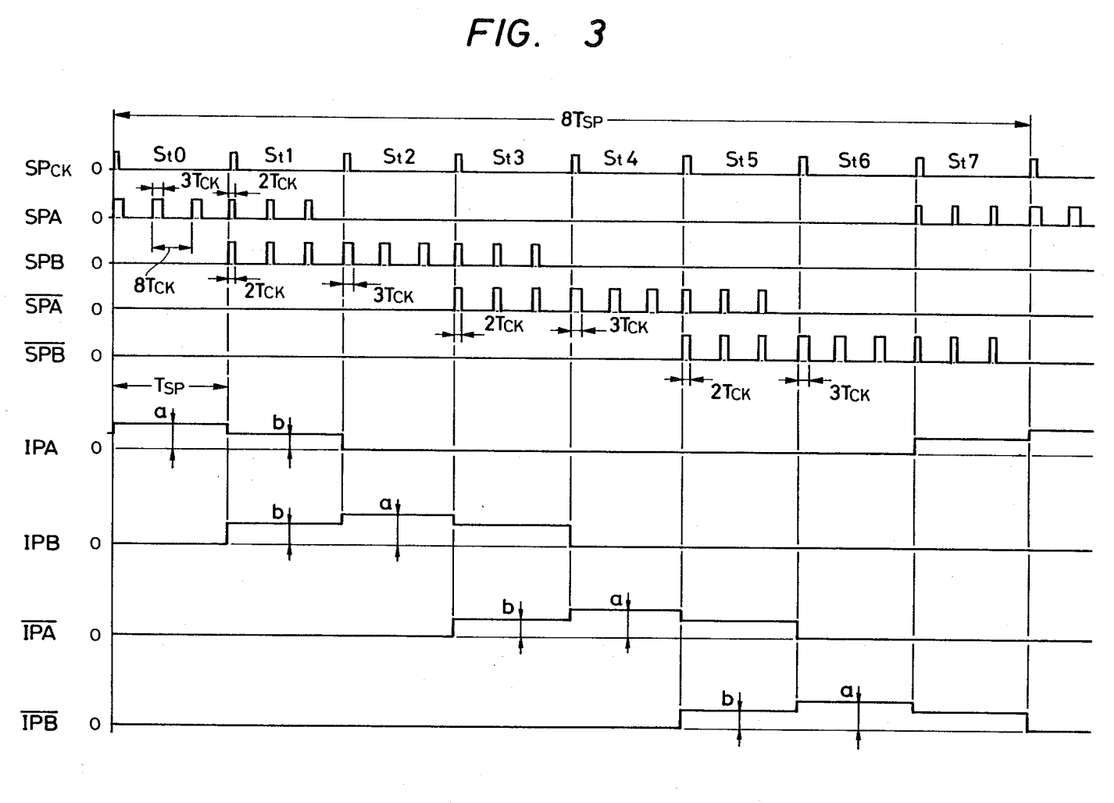
FIG. 3 is a timing chart illustrating the operation of the circuit of FIG. 1.

FIG. 3 is a time chart for illustrating the operation of the circuit of FIG. 1 as a whole. In FIG. 3, the phase switching addresses $A_3$–$A_5$ from the first address counter 5 are successively repeated according to the step pulse SPCK and the steps ranging from 0 ($S_t0$ in the drawing) to 7 ($S_t7$) are repeatedly carried out. Assuming that one step switching period (phase switching period) is TSP ($1/f_{sp}$), the repetitive period ranging from the step $S_t0$ up to $S_t7$ will be 8 TSP. While any one step is designated (during TSP), the eight words corresponding to the current control adddresses $A_0$–$A_2$ are repeatedly accessed several times and the switching control pulse signals SPA-SPB of the duty corresponding to the number of words written to the phase switching data are respectively outputted. In FIG. 3, although there is shown an example accessing the eight words iteratively three times during the one step period TSP, the number of repetitions may be unlimited and an integer number of repetitions is not required if the operation is repeated roughly several times.

With respect to each phase switching control signal SPA-$\overline{\text{SPB}}$ of FIG. 3, the duty pulse corresponding to each phase control data as mentioned above applies and, for instance, a pulse width duty $\frac{3}{8}$ ($=37.5\%$) becomes available to only the signal SPA in the case of step $S_t0$ and another with duty 2/8 ($=25\%$) available to the signals SPA and SPB in the case of the step $S_t1$ respectively. Due to the signals SPA-$\overline{\text{SPB}}$, the corresponding switching elemens 3A-$\overline{3B}$ are respectively ON/OFF controlled, whereby the current flowing through phase coil 2A-$\overline{2B}$ is controlled in terms of IPA-IPB of FIG. 3. Given that the phase current value is "a" when the duty of each phase switching control pulse signal is $\frac{3}{8}$ and the phase current value is "b" when the duty of the pulse signal is 2/8, a:b will be roughly 3:2.

By this is meant that the torque obtained from each phase coil when the phase A coil 2A and the phase B coil 2B in the step $S_t1$ are simultaneously excited is roughly $\frac{2}{3}$ ($=0.67$) times as much as the torque obtained at the time of one phase excitation. For instance. only the phase A coil 2a is excited in the step $S_t0$.

Figures 4A, 4B:
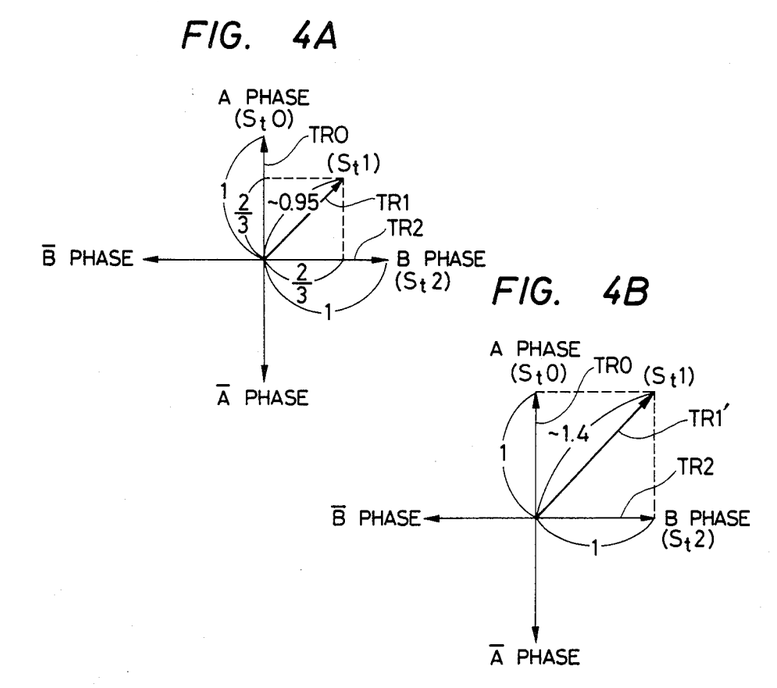
FIGS. 4A and 4B are diagrams illustrating torque vectors of this embodiment and a conventional motor.

Accordingly, as is obvious from FIG. 4A, the absolute value of the torque TR1 of the step $S_t1$ is $$\sqrt{0.67^2 + 0.67^2} = 0.95$$

and roughly equal to 0.95 times as high as that at the time of one phase excitation. Thus, the torque of each step is kept almost constant. On the other hand, the absolute value of the torque at the time of two-phase excitation in the conventional one-two phase excitation driving becomes, as is obvious from the torque TR1' shown in the step $S_t1$ of FIG. 4B, $$\sqrt{1^2 + 1^2} = 1.4$$

which is roughly 1.4 times as large as the torque at the time of one phase excitation, allowing torque variation per step to become large and, because the unbalance becomes a source of vibration and noise, an angular error is caused often when a load is applied thereto.

According to the first embodiment of the present invention, since the torque balance in each step is kept roughly constant, the occurrence of not only vibration, but also noise, can be prevented and angular error when a load is applied can be minimized. Moreover, each phase switching element is driven by a pulse during one step and the duty of the pulse is so controlled as to control each phase current value in the first embodiment, that is, implement a so-called PWM (Pulse Width Modulation) type chopper driving. However, an attempt to realize this by an analog circuit requires at least a circuit for generating a reference triangle wave (or saw tooth wave), a d.c. level generating circuit and a level comparator and this will increase the number of parts and make the cirucit configuration overly complicated. In addition, regulating means such as expensive variable resistors will be required. In contrast, PWM type chopper driving is realizable with an extremely simple circuit using memory elements 4 where data shown in Table 1 are stored beforehand. By utilizing chopper driving, high speed driving is possible and, because the current is subject to less fluctuation due to the pulse rate, greater efficiency is effectively accomplished.

Figure 5:
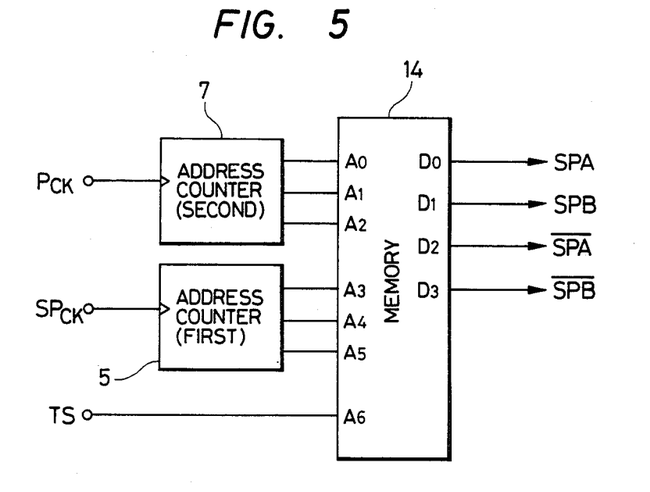
FIG. 5 is a block circuit diagram illustrating another embodiment of the present invention.

FIG. 5 shows another embodiment of the present invention, wherein memory elements 14 having a memory capacity twice as large as that of the memory elements in the first embodiment are used and an address $A_6$ is used to provide a total seven bit address. The memory element comprises a first block wherein data totalling 64 words shown in Table 2 is stored and a second block wherein words twice as many as eight words per step in Table 2 are arranged for the phase switching data, one of the two blocks being selected according to the address $A_6$. The duty of each phase switching control pulse signal obtained by reading each phase control data of the second block is 6/8 (=75%) when only one phase is excited and 4/8 (=50%) when two phases are simultaneously excited. As a result, each phase current in each step is doubled compared with what is shown in the first embodiment and thus its absolute value can also be doubled by keeping the torque balance constant. A torque switching control signal TS is supplied to the address $A_6$ terminal of the memory element from the input terminal 15 and one of the two blocks is selected according to the signal TS and the motor is driven according to the torque corresponding to the block. Description of other parts of construction will be omited since they are identical with those shown in the first embodiment, whereas like reference characters designate like parts referred to in the first embodiment.

Figure 6:
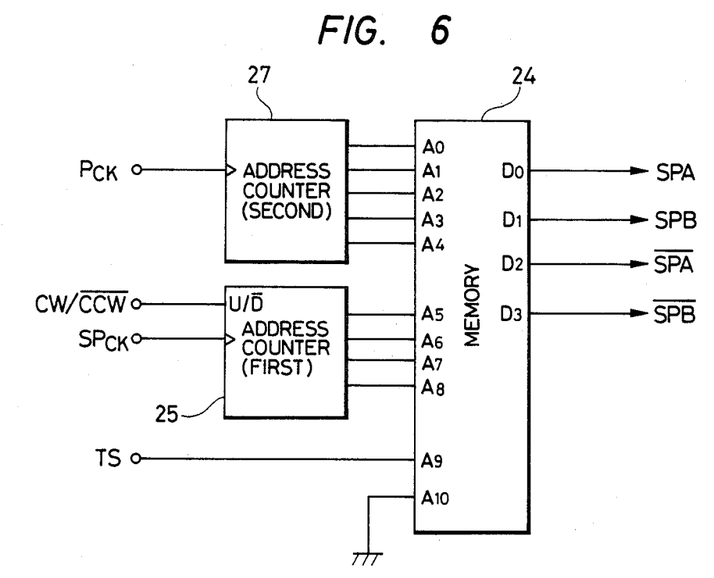
FIG. 6 is a block circuit diagram illustrating still another embodiment of the present invention.

The motor can effectively be utilized further by making a plurality of blocks store data set to increase the capacity of memory elements and obtain several kinds of torque. FIG. 6 is a block circuit diagram illustrating still another motor embodying the present invention. In FIG. 6, a memory element 24 is provided with four bit data $D_0$-$D_3$ output terminals and at least 10 bit address $A_0$-$A_9$ input terminals and has a capacity of $2^{10} = 1,024$ words in terms of four bits per word. Each phase switching control signal SPA-$\overline{SPB}$ is respectively outputed from the data $D_0$-$D_3$ terminals of the memory element 24, respectively, and, for instance, sent to each control terminal of the switching elements 3A-3B of FIG. 1. First address counter 25 of FIG. 6 is a reversible binary counter of four bits (hexadecimal) and the step pulse SPCK and the rotational angle switching control signal CW/$\overline{CCW}$ are supplied to the clock input terminal and the up/down switching terminal, respectively. The four bit output from the address counter 25 is supplied to each of the addresses $A_5$-$A_8$ of the memory element 24 and these addresses $A_5$-$A_8$ are, as shown in Table 3, indicating the internal data of the memory element 24, used as phase switching addresses. Subsequently, the second address counter 27 is a binary counter of five bits (which counts up to 32) and the high speed clock pulse PCX is supplied to the clock input terminal and five bit output from the counter 27 is supplied to each of the addresses $A_0$-$A_4$ of the memory element 24. These addresses $A_0$-$A_4$ are used as current control addresses as shown in Table 3. Moreover, the torque switching control signal TS is supplied to the address $A_9$ terminal of the memory element 24 as in FIG. 6.

TABLE 3

| SELECT $A_9$ | PHASE SWITCHING ADDRESS $A_8$~$A_5$ | CURRENT CONTROL ADDRESS $A_4$~$A_0$ | PHASE CONTROL DATA | | | | SELECT $A_9$ | CURRENT CONTROL ADDRESS $A_4$~$A_0$ |
|---|---|---|---|---|---|---|---|---|
| | | | $\overline{B}$ $D_3$ | A $D_2$ | B $D_1$ | $\overline{A}$ $D_0$ | | |
| 0 | 0 | 0~23 | 0 | 0 | 0 | 1 | 1 | 0~12 |
| | | 24~31 | 0 | 0 | 0 | 0 | | 13~31 |
| | 1 | 0~12 | 0 | 0 | 0 | 1 | | 0~6 |
| | | 13~21 | 0 | 0 | 1 | 1 | | 7~11 |
| | | 22~31 | 0 | 0 | 0 | 0 | | 12~31 |
| | 2 | 0~16 | 0 | 0 | 1 | 1 | | 0~8 |
| | | 17~31 | 0 | 0 | 0 | 0 | | 9~31 |
| | 3 | 0~8 | 0 | 0 | 1 | 1 | | 0~4 |
| | | 9~21 | 0 | 0 | 1 | 0 | | 5~11 |
| | | 22~31 | 0 | 0 | 0 | 0 | | 12~31 |
| | 4 | 0~23 | 0 | 0 | 1 | 0 | | 0~12 |
| | | 24~31 | 0 | 0 | 0 | 0 | | 13~31 |
| | 5 | 0~12 | 0 | 0 | 1 | 0 | | 0~6 |
| | | 13~21 | 0 | 1 | 1 | 0 | | 7~11 |
| | | 22~31 | 0 | 0 | 0 | 0 | | 12~31 |
| | 6 | 0~16 | 0 | 1 | 1 | 0 | | 0~8 |
| | | 17~31 | 0 | 0 | 0 | 0 | | 9~31 |
| | 7 | 0~8 | 0 | 1 | 1 | 0 | | 0~4 |
| | | 9~21 | 0 | 1 | 0 | 0 | | 5~11 |
| | | 22~31 | 0 | 0 | 0 | 0 | | 12~31 |
| | 8 | 0~23 | 0 | 1 | 0 | 0 | | 0~12 |
| | | 24~31 | 0 | 0 | 0 | 0 | | 13~31 |
| | 9 | 0~12 | 0 | 1 | 0 | 0 | | 0~6 |
| | | 13~21 | 1 | 1 | 0 | 0 | | 7~11 |
| | | 22~31 | 0 | 0 | 0 | 0 | | 12~31 |
| | 10 | 0~16 | 1 | 1 | 0 | 0 | | 0~8 |
| | | 17~31 | 0 | 0 | 0 | 0 | | 9~31 |
| | 11 | 0~8 | 1 | 1 | 0 | 0 | | 0~4 |
| | | 9~21 | 1 | 0 | 0 | 0 | | 5~11 |
| | | 22~31 | 0 | 0 | 0 | 0 | | 12~31 |

TABLE 3-continued

| SELECT $A_9$ | PHASE SWITCHING ADDRESS $A_8-A_5$ | CURRENT CONTROL ADDRESS $A_4-A_0$ | PHASE CONTROL DATA B $D_3$ | A $D_2$ | B $D_1$ | A $D_0$ | SELECT $A_9$ | CURRENT CONTROL ADDRESS $A_4-A_0$ |
|---|---|---|---|---|---|---|---|---|
| | 12 | 0~23 | 1 | 0 | 0 | 0 | | 0~12 |
| | | 24~31 | 0 | 0 | 0 | 0 | | 13~31 |
| | 13 | 0~12 | 1 | 0 | 0 | 0 | | 0~6 |
| | | 13~21 | 1 | 0 | 0 | 1 | | 7~11 |
| | | 22~31 | 0 | 0 | 0 | 0 | | 12~31 |
| | 14 | 0~16 | 1 | 0 | 0 | 1 | | 0~8 |
| | | 17~31 | 0 | 0 | 0 | 0 | | 9~31 |
| | 15 | 0~8 | 1 | 0 | 0 | 1 | | 0~4 |
| | | 9~21 | 0 | 0 | 0 | 1 | | 5~11 |
| | | 22~31 | 0 | 0 | 0 | 0 | | 12~31 |

As set forth above, in the third embodiment, steps from 0 up to 15, that is, 16 steps in total are successively designated by the four bit phase switching addresses $A_5$-$A_8$ and the phase control data of 32 words are repeatedly scanned according to the five bit current control addresses $A_0$-$A_4$ for each step. At this time each phase current value is controllable in 32 stages and each phase torque is also controllable in 32 stages. Accordingly, for instance, by adjusting the torque of the phase A and that of the phase B to a predetermined ratio, the full step from the phases A to B may be divided into a minute step of about ¼ and, despite the four phase step motor in the unipolar driving method, 16 step driving becomes possible.

In Table 3, by attaching importance to the ratio of the phase current A to the phase current B (that is, the ratio of the phase A torque to the phase B torque), because the torque generated in phase is 90° out of phase with the other torque, the calculated directional angle $\theta$ of synthetic torque of the phase A torque and phase B torque with the direction of the phase A torque as a reference and the calculated absolute $|TR|$ value of the synthetic torque are shown in Table 4.

TABLE 4

| | $A_9 = 0$ | | | $A_9 = 1$ | | |
|---|---|---|---|---|---|---|
| Step: | A:B | $\theta$ | $|TR|$ | A:B | $\theta$ | $|TR|$ |
| 0 | 24:0 | 0° | 24 | 13:0 | 0° | 13 |
| 1 | 22:9 | 22.25° | 23.77 | 12:5 | 22.62° | 13 |
| 2 | 17:17 | 45° | 24.04 | 9:9 | 45° | 12.7 |
| 3 | 9:22 | 67.75° | 23.77 | 5:12 | 67.38° | 13 |
| 4 | 0:24 | 90° | 24 | 0.13 | 90° | 13 |

Figure 7:
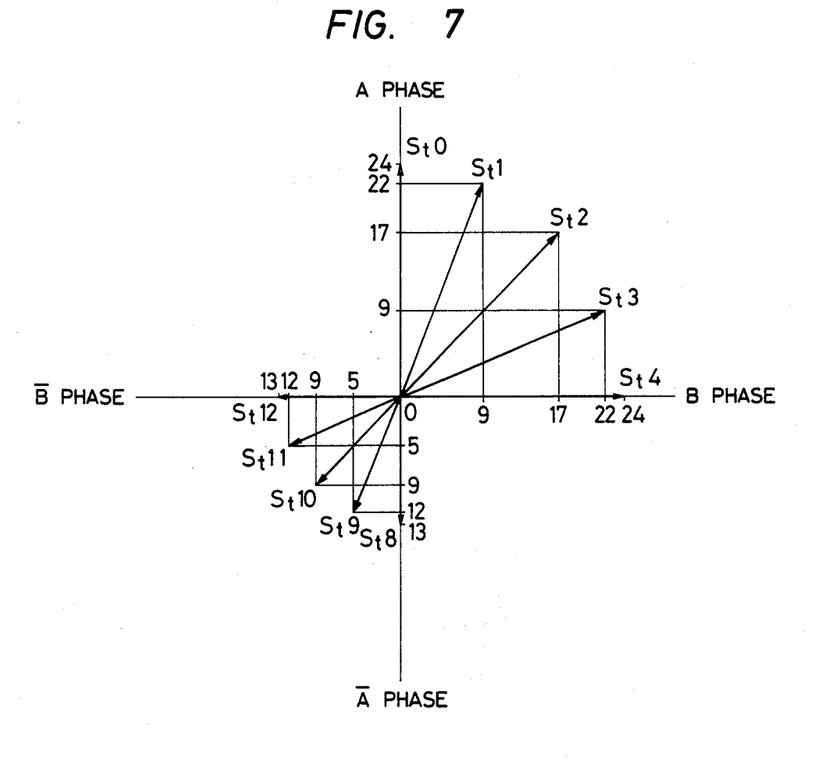
FIG. 7 is a diagram illustrating a torque vector of the emodiment of FIG. 6.

FIG. 7 shows a torque vector of each step, that is, the torque vector of each step $S_{t0}$-$S_{t4}$ when $A_9=0$ between the phase A and B, and the torque vector of each step $S_{t8}$-$S_{t12}$ when $A_9=1$ between the phases $\overline{A}$ and $\overline{B}$. As is obvious from FIG. 7, by dividing the full step (for instance from the phase A to B) roughly into four, the absolute value of the torque is converted into two different values for control purposes while the torque balance in each step is kept constant.

According to the third embodiment, one step can be divided into those more minute than ½ of the full step, which has been difficult to realize in the conventional control circuit for driving a step motor through the unipolar driving one-two phase exciting method. This is achieved by changing the data of the memory element without adding a new circuit and controlling the absolute value of the torque while keeping the torque balance of each step stable. Accordingly, control circuits simple in construction for minute step driving step motors requiring high resolution with less vibration and noise can be offered inexpensively. In such equipment as X-Y plotters, for instance, because they require accurate vibration -noise-free operation in moving a writing head, the control ciruclt according to the present invention is extremely effective.

The present invention is not limited to the above examples and for instance, the number of data bits of the memory element may be determined according to the number of phases of the step motor applied and even the number of address bits may be set according to the number of steps, switching stages of phase current or kinds of absolute values of the torque. Moreover, the first and second address counters may be built in the form of software using a microcomputer. In addition, it is also applicable to circuits in the bipolar driving method.

In the control circuit according to the present invention, it is possible to control each current value by the second address counter which increases the capacity of the memory element and specifies the address for controlling current without using an analog circuit such as a current control circuit. Accordingly, the control circuit readily stabilizes torque balance, attains high resolution due to increase in the number of steps, increases accuracy and controls the absolute value of the torque, whereas the motor can be driven with minute steps, less noise and vibration, satisfactory torque control and at high speed depending on the load.

We claim:

1. A control circuit for driving. in response to step driving pulses, a step motor with at least first and second phase coils each having corresponding phase control elements, said control circuit comprising:

memory means for storing phase switching data to control said phase control elements and having a plurality of output terminals adapted to be connected to said phase control elements for supplying phase switching signals to said phase control elements and first and second sets of input terminals for receiving data addresses;

a first address counter having output terminals connected to said first set of terminals for successively supplying phase switching data addresses to said memory means in response to said step driving pulses and an input terminal adapted for receiving said step driving pulses;

a second address counter having output terminals connected to said second set of terminals for successively supplying data addresses to said memory means to determine the on/off status of said phase switching data and an input terminal for receiving clock pulses; and pulse generating means connected to said input of said second counter for supplying clock pulses at a frequency greater than the frequency of said step driving pulses.

2. In combination:

a step motor with at least first and second phase coils each having corresponding phase control elements; and a control circuit for driving said step motor in response to step driving pulses, including (1) memory means for storing phase switching data to control said phase control elements and having a plurality of output terminals connected to said phase control elements for supplying phase switching signals to said phase control elements and first and second sets of input terminals for receiving said data addresses, (2) a first address counter having output terminals connected to said first set of terminals for successively supplying phase switching data addresses to said memory means in response to said step driving pulses and an input terminal for receiving said step driving pulses, (3) a second address counter having output terminals connected to said second set of terminals for successively supplying data addresses to said memory means to determine the on/off status of said phase switching data and an input terminal for receiving clock pulses, and (4) pulse generating means connected to said input of said second counter for supplying clock pulses at a frequency greater than the frequency of said step driving pulses.

* * * * *

UNITED STATES PATENT AND TRADEMARK OFFICE
CERTIFICATE OF CORRECTION

PATENT NO. : 4,642,544

DATED : February 10, 1987

INVENTOR(S) : Furumura et al

It is certified that error appears in the above-identified patent and that said Letters Patent is hereby corrected as shown below:

On the Title Page, Item [73] should read:

-- Mitsubishi Denki Kabushiki Kaisha, Toyko, Japan
   Max Co., Ltd. Tokyo, Japan --.

Signed and Sealed this

Twenty-second Day of September, 1987

Attest:

DONALD J. QUIGG

Attesting Officer     Commissioner of Patents and Trademarks